(12) United States Patent
Dai et al.

(10) Patent No.: US 8,373,392 B2
(45) Date of Patent: Feb. 12, 2013

(54) BATTERY SYSTEM AND PROTECTION APPARATUS THEREOF

(75) Inventors: Lung Dai, Taipei Hsien (TW);
Wang-Chang Duan, Shenzhen (CN);
Bang-Sheng Zuo, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 565 days.

(21) Appl. No.: 12/607,977

(22) Filed: Oct. 28, 2009

(65) Prior Publication Data
US 2010/0141216 A1 Jun. 10, 2010

(30) Foreign Application Priority Data
Dec. 5, 2008 (CN) .......................... 2008 1 0305995

(51) Int. Cl.
*H02J 7/00* (2006.01)
*H02H 3/00* (2006.01)
*H02H 3/24* (2006.01)
*H02H 7/18* (2006.01)

(52) U.S. Cl. .............. 320/136; 361/86; 361/88; 361/92; 307/10.7

(58) Field of Classification Search .................. 320/136, 320/132, 134; 361/79, 86, 88, 90, 92; 340/636.1, 340/636.12, 636.15; 307/10.7
See application file for complete search history.

(56) References Cited

U.S. PATENT DOCUMENTS

| 3,646,354 | A | * | 2/1972 | Von Brimer ................. 307/10.7 |
| 4,005,344 | A | * | 1/1977 | Gaind et al. .................... 361/92 |
| 5,179,337 | A | * | 1/1993 | Staarman et al. ............. 320/136 |
| 5,569,550 | A | * | 10/1996 | Garrett et al. ..................... 429/7 |
| 5,691,619 | A | * | 11/1997 | Vingsbo .......................... 361/86 |
| 6,111,731 | A | * | 8/2000 | Cepynsky et al. .............. 361/23 |
| 6,410,997 | B1 | * | 6/2002 | Sjursen et al. ................ 307/130 |
| 7,586,292 | B1 | * | 9/2009 | Wakefield et al. ............ 320/136 |
| 8,049,464 | B2 | * | 11/2011 | Muntermann ................ 320/128 |
| 2005/0244712 | A1 | | 11/2005 | Miyamoto et al. | |

FOREIGN PATENT DOCUMENTS
TW 211959 8/1993
TW 248352 5/1995

* cited by examiner

*Primary Examiner* — Richard V Muralidar
(74) *Attorney, Agent, or Firm* — Altis Law Group, Inc.

(57) ABSTRACT

A battery system includes a battery and a battery protection apparatus. The battery protection apparatus protects the battery from over-discharge. The battery protection apparatus includes a voltage controlled switch, a start switch, and a voltage detecting unit. The voltage controlled switch establishes an electrical connection between the battery and the load. The start switch turns on the voltage controlled switch when actuated. The voltage detecting unit detects a battery voltage of the battery and generates a detecting voltage according to the battery voltage. The voltage controlled switch is turned off when the detecting voltage is lower than a predetermined value.

16 Claims, 1 Drawing Sheet

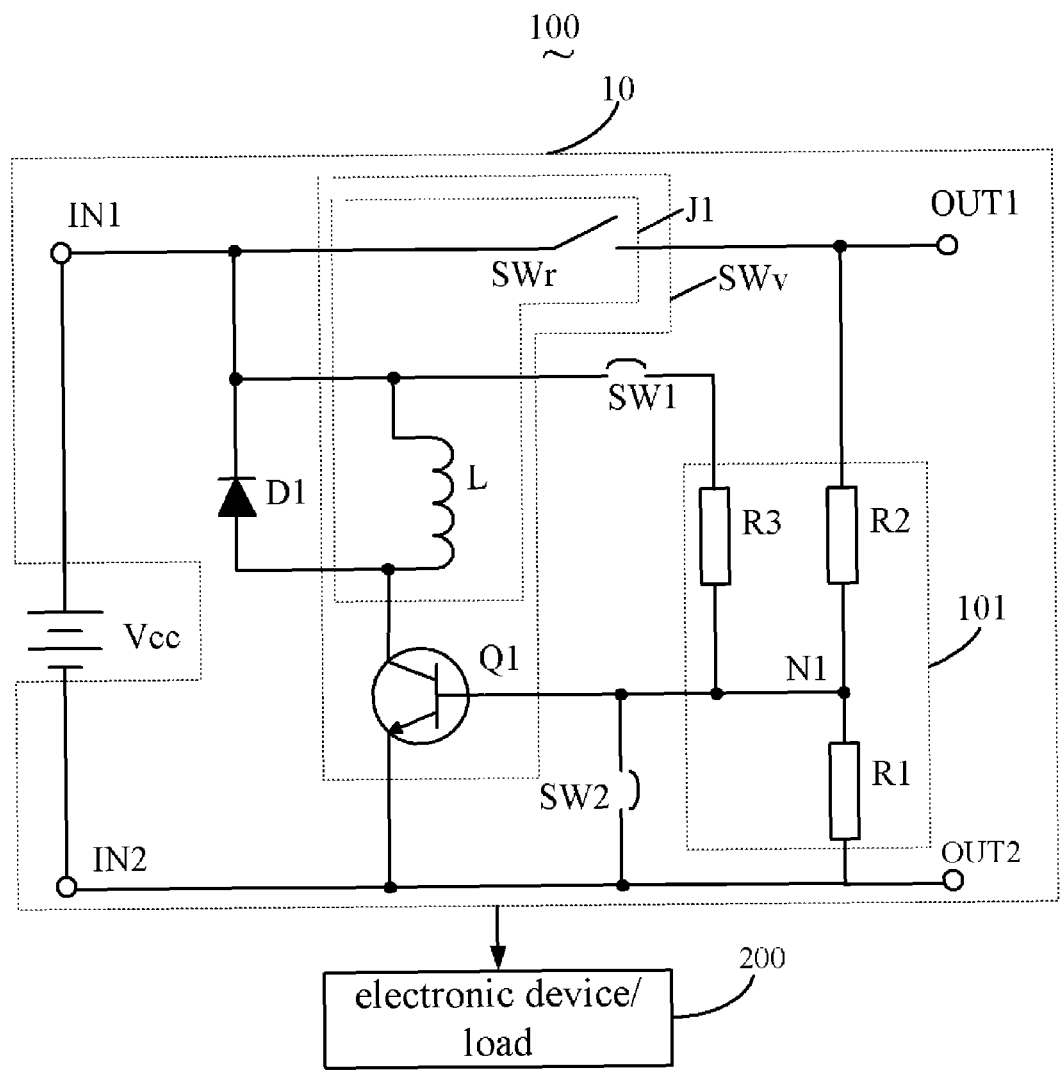

BATTERY SYSTEM AND PROTECTION APPARATUS THEREOF

BACKGROUND

1. Technical Field

The present disclosure relates to batteries, and particularly to a rechargeable battery system and a battery protection apparatus.

2. Description of Related Art

Rechargeable batteries tend to over-discharge when used incorrectly. For example, when a battery has discharged to the manufacturer specification and power is still being drawn from the battery, over-discharge will be the result.

It is found that, over-discharge may cause damage to rechargeable batteries, especially at heavy current or repeated over-discharge. Commonly over-discharge raises the inner pressure of the rechargeable battery, and the reversibility of the rechargeable battery will be damaged. When recharging an over-charged battery the capacity of the rechargeable battery is reduced.

Therefore, a battery system and a battery protection apparatus for preventing the battery over-discharge is desired.

BRIEF DESCRIPTION OF THE DRAWINGS

Many aspects of the embodiments can be better understood with reference to the following drawing. The components in the drawing are not necessarily drawn to scale, the emphasis instead being placed upon clearly illustrating the principles of the present embodiments.

The FIGURE is a circuit of a battery protection apparatus.

DETAILED DESCRIPTION

Referring to the FIGURE, a battery system 100 is configured for supplying electrical power to an electronic device 200 or other loads. In the embodiment, the battery system 100 supplies a direct current (DC) voltage to the electronic device 200. The battery system 100 includes at least one battery Vcc and a battery protection apparatus 10 coupled to the at least one battery Vcc. In the embodiment, the battery Vcc is a rechargeable battery, such as a lithium-ion battery. The battery protection apparatus 10 is configured to protect the battery Vcc from over-discharge, so as to prevent the battery Vcc from damage caused by the over-discharge. The battery protection apparatus 10 is also configured to establish and discontinue an electrical connection between the battery Vcc and the electronic device 200 according to user inputs.

The battery protection apparatus 10 includes a first input terminal IN1, a second input terminal IN2, a start switch SW1, a voltage controlled switch SWv, a voltage detecting unit 101, a first output terminal OUT1, a second output terminal OUT2, a stop switch SW2, and a diode D1.

The battery protection apparatus 10 receives a battery voltage supplied by the battery Vcc via the first input terminal IN1 connecting to an anode of the battery Vcc and the second terminal IN2 connecting to a cathode of the battery Vcc. The first and the second output terminals OUT1, OUT2 supply the battery voltage processed by the battery protection apparatus 10 to the electronic device 200. The second input terminal IN2 is connected to the second output terminal OUT2.

The voltage controlled SWv is configured for establishing the electrical connection between the battery Vcc and the electronic device 200. The start switch SW1 is configured for closing (turn on) the voltage controlled switch SWv when actuated, thereby, establishing the electrical connection. The voltage detecting unit 101 is configured for detecting the battery voltage supplied from the battery Vcc after the start switch SW1 is actuated, and generating a detected voltage according to the battery voltage. When the detecting voltage is lower than a predetermined value, the battery Vcc has over-discharged. In this case, the voltage detecting unit 101 outputs a signal to open (turn off) the voltage controlled switch SWv that the electrical connection is discontinued. The stop switch SW2 is configured for opening the voltage controlled switch SW1 to discontinue the electrical connection when actuated.

The start switch SW1 is a normally open switch. The start switch SW1 is connected between the first input terminal IN1 and the voltage detecting unit 101.

The voltage controlled switch SWv includes a relay J1 and a bipolar junction transistor (BJT) Q1. The relay J1 includes a relay coil L, and a normally open relay switch SWr. The relay switch SWr is connected between the first input terminal IN1 and the first output terminal OUT1. One terminal of the relay coil L is connected to the first input terminal IN1, and the other terminal of the relay coil L is connected to the collector of the BJT Q1. The emitter of the BJT Q1 is connected to the second input terminal IN2. The base of the BJT Q1 is connected to the voltage detecting unit 101. In other embodiments, a field effect transistor may replace the BJT Q1.

When the electronic device 200 needs to be turned off, the stop switch SW2 is turned on. As a result, the base of the BJT Q1 connects to the emitter of BJT Q1, and the BJT Q1 is deactivated. The relay J1 is powered off, the relay switch SWr is opened, and the battery Vcc and the electronic device 200 are disconnected. The battery Vcc does not supply the battery voltage to the electronic device 200.

The stop switch SW2 is also a normally open switch. The stop switch SW2 is connected between the base and the emitter of the BJT Q1. The cathode of the diode D1 is connected to the first input terminal IN1, and the anode of the diode D1 is connected to the collector of the BJT Q1.

The voltage detecting unit 101 includes a first resistor R1, a second resistor R2, and a third resistor R3. One end of the second resistor R2 is connected to the relay switch SWr and the first output terminal OUT1, and the other end of the second resistor R2 is connected to the second input terminal IN2 via the first resistor R1. One end of the third resistor R3 is connected to the start switch SW1, and the other end of the third resistor R3 is connected to a node N1 located between the first and the second resistors R1, R2. The node N1 between the first and second resistors R1, R2 is also connected to the base of the BJT Q1.

In operation, when the start switch SW1 is closed, a battery voltage is supplied from the battery Vcc to the base of the BJT Q1 via the resistor R3, and the BJT Q1 activated. As a result, the relay J1 is triggered, and the relay switch SWr is closed. The battery voltage is supplied to the electronic device 200 and the voltage detecting unit 101. The voltage detecting unit 101 generates the detected voltage based on the battery voltage, and supplies the detecting voltage to the base of the BJT Q1. When the detecting voltage is higher than the predetermined value, the battery Vcc has not over-discharged, and the BJT Q1 remains in an on-state. When the detecting voltage is lower than the predetermined value, it is determined that the battery Vcc is over-discharged, and the BJT Q1 is turned off. As a result, the relay is powered off, the relay switch SWr is opened, and the electrical connection between the battery Vcc and the electronic device 200 is discontinued. Thus, the battery Vcc is protected from over-discharge. Furthermore, the diode D1 prevents damage to the relay J1, caused by transient high voltage applied to the relay J1.

When the electronic device 200 needs to be turned off, the stop switch SW2 is switched off. As a result, the base of the BJT Q1 connects to the emitter of BJT Q1, and the BJT Q1 is deactivated. The relay J1 is powered off, the relay switch SWr is opened, and the battery Vcc and the electronic device 200 are disconnected. The battery Vcc does not supply the battery voltage to the electronic device 200.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A battery system for supplying electrical power to a load, the battery system comprising:
   a battery; and
   a battery protection apparatus configured to protect the battery from over-discharge, the battery protection apparatus comprising:
   a voltage controlled switch configured to establish an electrical connection between the battery and the load, the voltage controlled switch comprising a relay, and a bipolar junction transistor;
   a voltage detecting unit for detecting a battery voltage of the battery and generating a detecting voltage according to the battery voltage; and
   a stop switch connected between a base and an emitter of the bipolar junction transistor;
   wherein when the detecting voltage is lower than a predetermined value, the bipolar junction transistor is turned off to disable the relay, such that the electrical connection between the battery and the load is discontinued; when the detecting voltage is higher than the predetermined value, the bipolar junction transistor is turned on to enable the relay to establish an electrical connection between the battery and the load.

2. The battery system of the claim 1, further comprising a start switch configured to turn on the voltage controlled switch when actuated.

3. The battery system of the claim 2, wherein the start switch is a normally open switch.

4. The battery system of the claim 2, wherein the battery protection apparatus further comprises a first input terminal connecting to an anode of the battery, a second input terminal connecting to a cathode of the battery, a first output terminal, and a second output terminal, the relay comprising a relay coil and a relay switch, the relay switch is connected between the first input terminal and the first output terminal, the relay coil is connected between the first input terminal and the collector of the BJT, the emitter of the BJT is connected to the second input terminal, the base of the BJT is connected to the voltage detecting unit.

5. The battery system of the claim 4, the voltage detecting unit comprises a first resistor, a second resistor, and a third resistor, one end of the second resistor is connected to the relay switch and the first output terminal, and the other end of the second resistor is connected to the first input terminal via the first resistor; one end of the third resistor is connected to the start switch, and the other end of the third resistor is connected to a node located between the first resistor and the second resistor; the node between the first and the second resistor is further connected to the base of the BJT.

6. The battery system of the claim 5, further comprising a diode, a cathode of the diode is connected to the first input terminal, and an anode of the diode is connected to the collector of the BJT.

7. The battery system of the claim 5, wherein the stop switch is configured to turn off the voltage controlled switch to discontinue the electrical connection between the battery and the load.

8. The battery system of the claim 7, wherein the stop switch is a normally open switch.

9. A battery protection apparatus for protecting a battery from over-discharging, the battery protection apparatus comprising:
   a voltage controlled switch configured to establish an electrical connection between the battery and the load, the voltage controlled switch comprising a relay, and a bipolar junction transistor;
   a voltage detecting unit for detecting a battery voltage of the battery and generating a detecting voltage according to the battery voltage; and
   a stop switch connected between a base and an emitter of the bipolar junction transistor;
   wherein when the detecting voltage is lower than a predetermined value, the bipolar junction transistor is turned off to disable the relay, such that the electrical connection between the battery and the load is discontinued; when the detecting voltage is higher than the predetermined value, the bipolar junction transistor is turned on to enable the relay to establish an electrical connection between the battery and the load.

10. The battery protection apparatus of the claim 9, further comprising a start switch configured to turn on the voltage controlled switch when actuated.

11. The battery protection apparatus of the claim 9, wherein the start switch is a normally open switch.

12. The battery protection apparatus of the claim 10, wherein the battery protection apparatus further comprises a first input terminal connecting to an anode of the battery, a second input terminal connecting to a cathode of the battery, a first output terminal, and a second output terminal, the relay comprising a relay coil and a relay switch, the relay switch is connected between first input terminal and the first output terminal, the relay coil is connected between the first input terminal and collector of the BJT, the emitter of the BJT is connected to the second input terminal, the base of the BJT is connected to the voltage detecting unit.

13. The battery protection apparatus of the claim 12, wherein the voltage detecting unit comprises a first resistor, a second resistor, and a third resistor, one end of the second resistor is connected to the relay switch and the first output terminal, and the other end of the second resistor is connected to the first input terminal via the first resistor; one end of the third resistor is connected to the start switch, and the other end of the third resistor is connected to a node between the first resistor and the second resistor; the node between the first and the second resistor is further connected to the base of the BJT.

14. The battery protection apparatus of the claim 13, further comprising a diode, a cathode of the diode is connected to the first input terminal, and an anode of the diode is connected to the collector of the BJT.

15. The battery protection apparatus of the claim 13, the stop switch is configured to turn off the voltage controlled switch to disconnect the electrical connection between the battery and the load.

16. The battery protection apparatus of the claim 15, wherein the stop switch is a normally open switch.

* * * * *